United States Patent
Lee

(10) Patent No.: US 8,983,726 B2
(45) Date of Patent: Mar. 17, 2015

(54) METHOD FOR SENSING WIND AND CONTROLLING VEHICLE USING PARKING ASSIST SYSTEM

(71) Applicant: Hyundai Motor Company, Seoul (KR)

(72) Inventor: Kwang-Soon Lee, Seoul (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 14/145,353

(22) Filed: Dec. 31, 2013

(65) Prior Publication Data

US 2015/0051793 A1    Feb. 19, 2015

(30) Foreign Application Priority Data

Aug. 19, 2013  (KR) .......................... 10-2013-0097891

(51) Int. Cl.
*G06F 7/02*      (2006.01)
*B62D 6/04*      (2006.01)

(52) U.S. Cl.
CPC ....................................... *B62D 6/04* (2013.01)
USPC .......................................................... 701/41

(58) Field of Classification Search
USPC .......................................................... 701/41
See application file for complete search history.

(56) References Cited

U.S. PATENT DOCUMENTS

| | | | | |
|---|---|---|---|---|
| 6,535,141 | B1 * | 3/2003 | Doherty | 340/905 |
| 6,538,578 | B1 * | 3/2003 | Doherty | 340/905 |
| 7,400,267 | B1 * | 7/2008 | Doherty et al. | 340/905 |
| 8,583,333 | B2 * | 11/2013 | Rennie et al. | 701/50 |
| 8,645,067 | B2 * | 2/2014 | Gallagher et al. | 702/3 |
| 2003/0178501 | A1 * | 9/2003 | Doherty | 239/1 |
| 2008/0251614 | A1 * | 10/2008 | Doherty et al. | 239/662 |
| 2010/0189498 | A1 * | 7/2010 | Doherty et al. | 404/72 |
| 2014/0265941 | A1 * | 9/2014 | Robinson et al. | 318/16 |
| 2014/0300504 | A1 * | 10/2014 | Shaffer et al. | 342/27 |

\* cited by examiner

*Primary Examiner* — Mary Cheung
*Assistant Examiner* — Frederick Brushaber
(74) *Attorney, Agent, or Firm* — McDermott Will & Emery LLP

(57) ABSTRACT

A method for sensing a wind and controlling a vehicle using a parking assist system (PAS) including a plurality of ultrasonic sensors and output devices is provided. The method includes controlling, by a controller, a first ultrasonic sensor disposed at a front side of a vehicle to transmit an ultrasonic signal. Respective primary indirect signals received from the ultrasonic sensors at the front side other than the first ultrasonic sensor are received by the controller. A second ultrasonic sensor adjacent to the first ultrasonic sensor to transmit the ultrasonic signal is controlled by the controller. Respective primary indirect signals received from the ultrasonic sensors at the front side other than the second ultrasonic sensor are received by the controller. The direction of the wind is sensed by the controller through a comparison of relative sizes of waveforms of each primary indirect signal and each secondary indirect signal.

7 Claims, 7 Drawing Sheets

STRONG WIND

METHOD FOR SENSING WIND AND CONTROLLING VEHICLE USING PARKING ASSIST SYSTEM

CROSS-REFERENCE TO RELATED APPLICATIONS

This application claims the benefit of priority under 35 U.S.C. §119 to Korean Patent Application No. 10-2013-0097891, filed on Aug. 19, 2013, in the Korean Intellectual Property Office, the disclosure of which is incorporated herein by reference in its entirety.

TECHNICAL FIELD

The present disclosure relates to a method for monitoring a wind that exists at front and rear sides of a vehicle while driving, and more particularly, to a technology that controls steering of a driver by monitoring a direction and size of a wind that blows on front and rear sides of a vehicle while driving.

BACKGROUND

In general, a vehicle is influenced by a strong wind blowing at a front, rear, or side of the vehicle while driving. Therefore, the wind according to an intensity swings a vehicle body, which is being driven, or veers the vehicle from a driving direction.

In order to solve such a problem, a wind direction sensor is provided in the vehicle to determine the intensity and a moving direction of the wind blowing toward the vehicle while driving. The wind direction sensor is associated with a steering device of the vehicle to compensate for an error due to the strong wind, thereby preventing the vehicle body from swinging or veering from the driving distance.

However, the vehicle having the conventional wind direction sensor needs a separate wind direction sensor in order to determine the intensity of the wind around the vehicle, and thus, manufacturing cost is inevitably increased.

In general, a parking assist system (hereinafter, referred to as 'PAS') assists a driver at the time of parking the vehicle. The PAS includes an ultrasonic sensor, a body control module (BCM) controlling the ultrasonic sensor, an output (a cluster and the like) outputting a direction and an intensity of a wind as an image or a warning message, and a motor-driven power steering system (MDPS) that controls steering.

The PAS is installed at the front side and/or the rear side of the vehicle to sense obstacles through the ultrasonic sensor and notifies a blind spot, which the driver cannot sense, to prevent an accident while parking. However, the ultrasonic signal may be indirectly received when the strong wind blows while driving the vehicle having the PAS. Therefore, a method to improve driving stability is required since the PAS is only used for parking.

SUMMARY

The present provides a method for sensing a wind or controlling a vehicle using a parking assist system (PAS). A magnitude of an ultrasonic signal, which is an input according to a direction and intensity of a wind that blows at front and rear sides of the vehicle, is monitored while driving by using the PAS provided in the vehicle. The direction and the intensity of the wind are deduced therethrough, and a warning message provided corresponds to the deduced direction and intensity of the wind. Steering is assisted to improve driver's convenience or to improve driving stability.

According to an exemplary embodiment of the present disclosure, a method for sensing a wind and controlling a vehicle using a parking assist system (PAS) including a plurality of ultrasonic sensors and output devices is provided. The method includes controlling, by a controller, a first ultrasonic sensor disposed at a front side of the vehicle to transmit an ultrasonic signal. Respective primary indirect signals are received from the ultrasonic sensors at the front side other than the first ultrasonic sensor by the controller A second ultrasonic sensor adjacent to the first ultrasonic sensor is controlled by the controller to transmit the ultrasonic signal. Respective primary indirect signals are received from the ultrasonic sensors at the front side other than the second ultrasonic sensor by the controller. A direction of a wind is sensed by comparing relative sizes of waveforms of each primary indirect signal and each secondary indirect signal by the controller.

The method may further include sensing, by the controller, that the wind moves toward the second ultrasonic sensor from the first ultrasonic sensor when the waveform of each primary indirect signal is larger than the waveform of each secondary indirect signal. It is sensed by the controller that the wind moves toward the first ultrasonic sensor from the second ultrasonic sensor when the waveform of each primary indirect signal is smaller than the waveform of each secondary indirect signal.

The method may further include comparing, by the controller, a waveform of a primary indirect signal or a secondary interference signal newly received with the waveform of each primary indirect signal or each secondary indirect signal.

The method may further include transmitting, by the controller, a warning message to an output when the sensed intensity of the wind is a first intensity.

The method may further include providing, by the controller, steering assistance force from a steering controller when the sensed intensity of the wind is a second intensity and the steering assistance force to correspond to the sensed direction of the wind.

The method may further include controlling, by the controller, a third ultrasonic sensor disposed at a rear side of the vehicle to transmit the ultrasonic signal. Respective primary indirect signals are received from rear ultrasonic sensors other than the third ultrasonic sensor by the controller. A fourth ultrasonic sensor adjacent to the third ultrasonic sensor is controlled to transmit the ultrasonic signal by the controller. Respective secondary indirect signals are received from the rear ultrasonic sensors other than the fourth ultrasonic sensor by the controller.

The method may further include comparing, by the controller, a waveform of a primary indirect signal or a secondary indirect signal newly received with the waveform of the primary indirect signal or the secondary indirect signal. The intensity of the wind is changed in proportion to the waveform of the primary indirect signal or the secondary indirect signal newly received with the waveform of the primary indirect signal or the secondary indirect signal.

The present disclosure configured as above achieves following effects:

1. A warning message for the direction or the intensity of the wind is provided to the driver without a cost increase by employing the existing PAS in order to assist vehicle parking, or steering assistance force is provided to prevent a risk caused by the strong wind and to improve driving stability.

2. It is notified that the driver senses the strong wind in a mountainous or coastal area or senses a vehicle pull when driving on a neighboring lane of a heavy-duty truck to improve safety through preventative driving.

3. When a steering angle higher than a driver's intention is generated while driving on a curve road due to the strong wind, an accident by a senior, female, an inexperienced, a fast driver or the like, is prevented by controlling a steering wheel, thereby improving safety.

DETAILED DESCRIPTION

A conventional known parking assist system (PAS) assists a driver while parking. It is configured to sense an obstacle when parking and driving by a plurality of ultrasonic sensors 10 that are installed at a front side and/or rear side of a vehicle.

However, an ultrasonic signal used in the PAS is refracted when a wind blows, and as a result, a moving direction of the ultrasonic signal may be changed.

Figure 1:
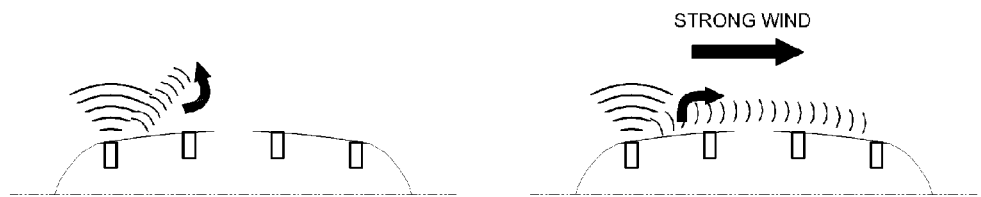
FIG. 1 illustrates an indirect reception phenomenon of an ultrasonic signal transmitted from a conventional parking assist system (PAS).

FIG. 1 illustrates an indirect reception phenomenon of an ultrasonic signal transmitted from a known parking assist system (PAS). As illustrated, when a strong wind blows around a vehicle, a moving direction of an ultrasonic signal, which is emitted from a parking assist system (PAS), is refracted by the strong wind. As a result, an indirect reception of the ultrasonic signal may occur.

A direction and an intensity of a wind which is generated around the vehicle are sensed by the indirect reception phenomenon in which the ultrasonic signal is refracted and indirectly received by the strong wind as described above. Through an indirect reception method of the PAS, that is, a method in which an ultrasonic sensor 10 transmitting the ultrasonic signal and the ultrasonic sensor 10 receiving the ultrasonic signal are differently configured from each other.

Therefore, since the PAS, which has already been provided in the vehicle, senses the wind as compared with the conventional system that further includes a separate wind direction sensor to sense the wind, the present disclosure reduces manufacturing cost by removing an additional component to sense the strong wind.

Hereinafter, exemplary embodiments of the present disclosure configured as above will be described in more detail with reference to the accompanying drawings.

Figure 2:
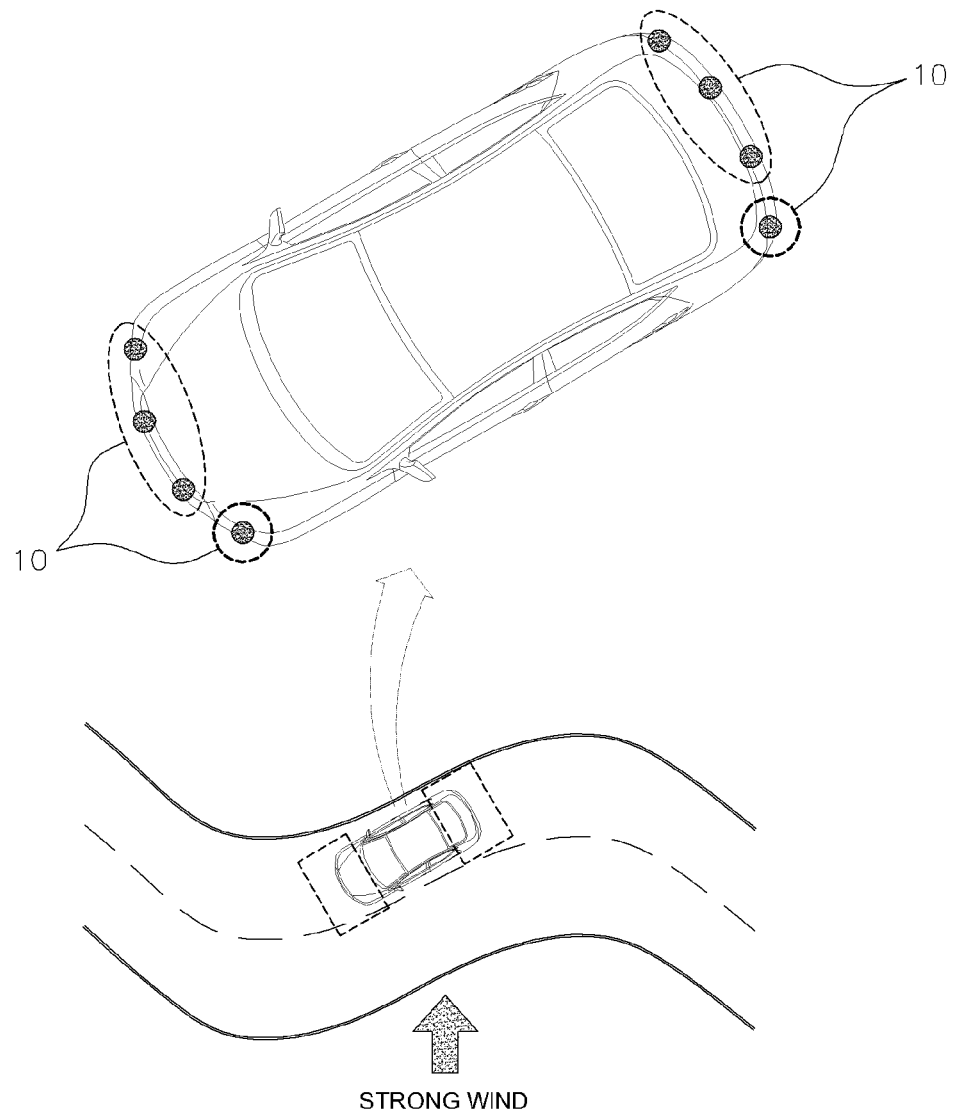
FIG. 2 is a schematic view illustrating a method for sensing a wind and controlling a vehicle using a parking assist system (PAS) according to an exemplary embodiment of the present disclosure.

FIG. 2 is a schematic view illustrating a method for sensing a wind and controlling a vehicle using a parking assist system (PAS) according to an exemplary embodiment of the present disclosure. As illustrated, the method for sensing a wind and controlling a vehicle using a parking assist system (PAS) determines a direction and an intensity of a wind which is generated around the vehicle while driving by a parking assist system (PAS) provided at front and rear sides of the vehicle in order to assist a driver.

In a description below, as illustrated in FIG. 2, the PAS, which is configured by placing four ultrasonic sensors at each of the front side and the rear side, is described as an exemplary embodiment. However, the present disclosure is not limited thereto, and it is apparent to those skilled in the art that any known PAS can be applied without departing from the scope of the present disclosure.

As illustrated, the method for sensing the wind and controlling the vehicle using the PAS senses the wind through the PAS provided in the vehicle. The PAS includes an ultrasonic sensor 10, a body control module (BCM) controlling the ultrasonic sensor 10, an output (a cluster and the like, not shown) outputting the direction and the intensity of the wind as an image or a warning message, and a motor-driven power steering (MDPS, (not shown)) that controls steering, and since the components are known, a detailed description thereof will be omitted.

The method for sensing a wind and controlling a vehicle using the PAS of the present disclosure may be achieved through the BCM constituting the PAS, but the present disclosure is not limited thereto and may be configured to further include a separate controller (an electronic control unit (ECU) and the like) in order to sense the wind around the vehicle. Hereinafter, the BCM or the separate controller is integrally referred to as a 'controller 20.'

Meanwhile, in the conventional PAS, when the vehicle drives at 10 Kph or more, an operation of the PAS may be limited to an operating area of the PAS. However, the present disclosure is configured to determine the intensity and the moving direction of the wind by monitoring, comparing, and analyzing an ultrasonic wave introduction signal for each ultrasonic sensor 10 in real time through the PAS when the vehicle drives at 10 Kph or more (for example, when the vehicle drives at 40 Kph or more).

In an exemplary embodiment of the present disclosure, in the PAS including four ultrasonic sensors 10 disposed at a regular interval at each of the front and rear sides of the vehicle, ultrasonic signals, which are introduced into the respective ultrasonic sensors 10 in real time, are different from each other (the number and a layout structure of the ultrasonic sensors of the PAS are known, and it is apparent to those skilled in the art that the number and the layout are not limited to a description made herein). Since the ultrasonic signal is refracted by the strong wind, an indirect reception phenomenon occurs. The controller 20 senses the intensity of the wind based on a reception waveform of the ultrasonic wave introduced into each ultrasonic sensor 10.

In an exemplary embodiment of the present disclosure, the controller 20 sets warning levels depending on the intensity of the wind and controls the wind according to a control step corresponding to the intensity of the wind sensed above. The controller 20 may output the warning message to the driver when the sensed intensity of the wind low (a first intensity) and provide assistance force by the steering device through the MDPS when the sensed intensity of the wind is high (a second intensity) to actively control steering.

In more detail, the controller 20 may set the control step depending on the intensity of the wind as three steps below:

A first control step as a control OFF step is for a low control level in which the intensity of the wind may not control depending on the wind because the intensity of the wind sensed when driving the vehicle on driving the vehicle is low. In this case, the controller 20 does not separately control.

A second control step as a warning step is for a medium control level in which the intensity of the wind sensed at the time of driving may influence driving of the vehicle in some degree. In this case, since the intensity of the wind may influence a vehicle body which is being driven, a warning message is output so as to warn the driver. In this case, the controller 20 sets the warning message (a message, an image, sound/voice, or the like) in advance and transmits and outputs the warning message to the output.

A third control step as an active steering control step is for a high control level in which the intensity of the wind sensed at the time of driving significantly influences driving of the vehicle. Accordingly, the controller 20 provides steering assistance force with predetermined torque by controlling the MDPS constituting the PAS and steers the vehicle at an angle equal to or less than or equal to or more than a driver's intention by applying the steering assistance force when the driver steers in a moving direction.

Figure 3:
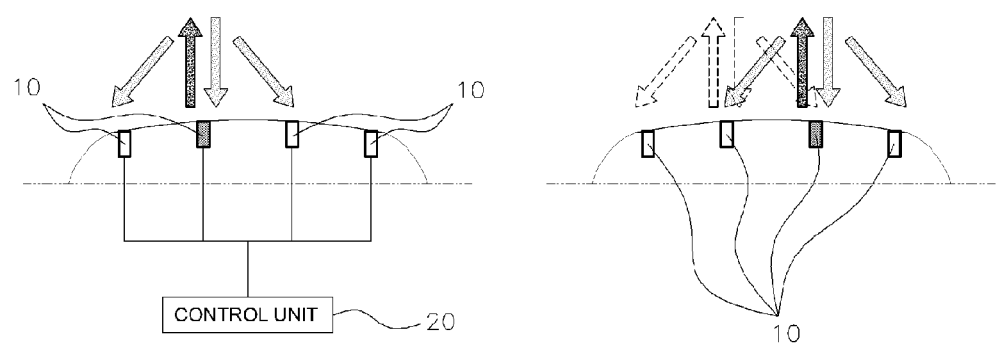
FIG. 3 illustrates a principle in which a controller senses an intensity of a wind through a parking assist system (PAS) in a method for sensing a wind and controlling a vehicle using the PAS.
Figure 4:
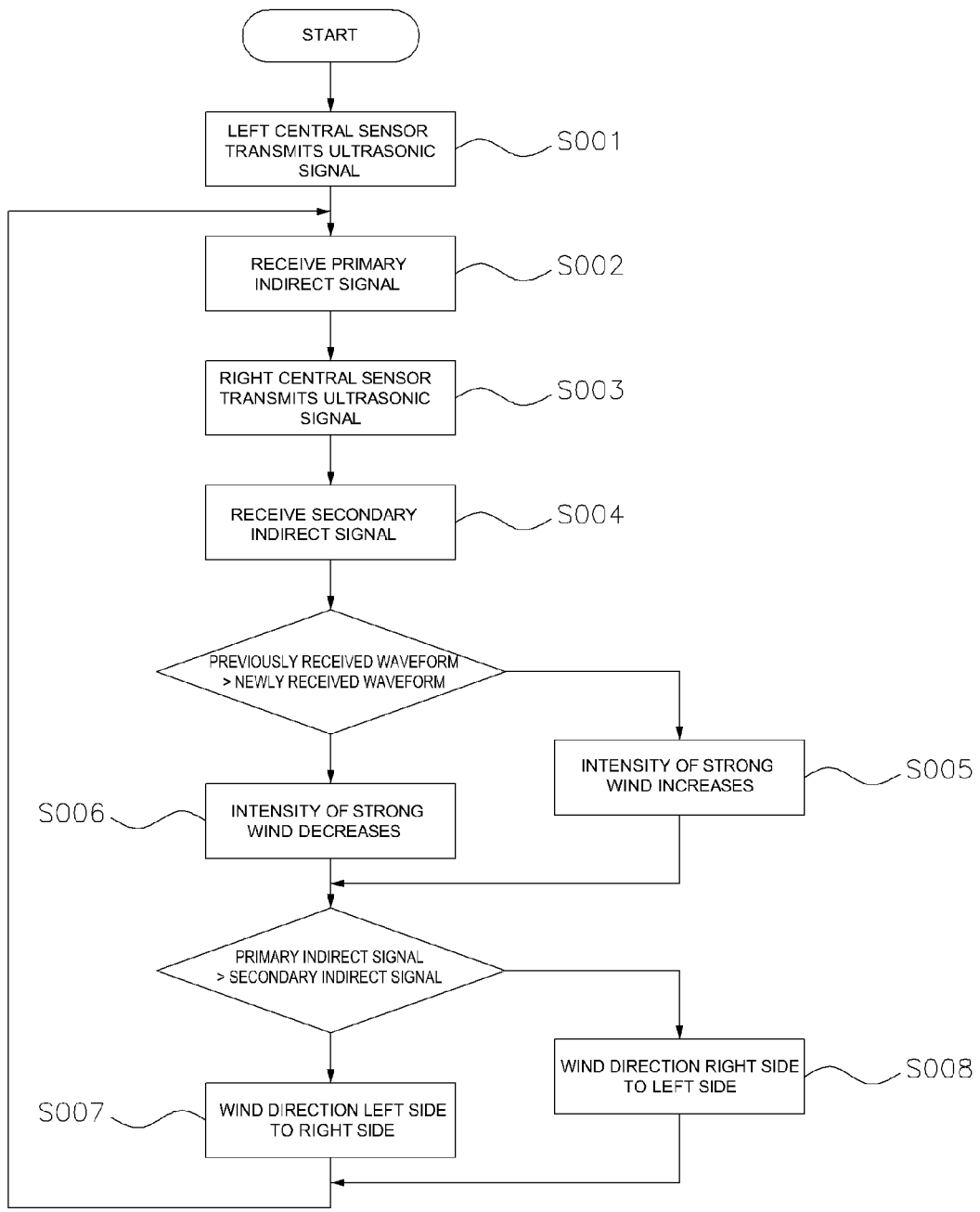
FIG. 4 is a flowchart illustrating a method for sensing a wind and controlling a vehicle using a parking assist system (PAS) according to an exemplary embodiment of the present disclosure.

FIG. 3 illustrates a principle in which a controller 20 senses an intensity of a wind through a parking assist system (PAS) in a method for sensing a wind and controlling a vehicle using the PAS. FIG. 4 is a flowchart illustrating a method for sensing a wind and controlling a vehicle using a parking assist system (PAS) according to an exemplary embodiment of the present disclosure.

FIG. 3 illustrates ultrasonic sensors 10 installed at a front or rear side of a vehicle. Since each of the ultrasonic sensors 10, which are installed at the front or the rear side of the vehicle, are identically configured, the ultrasonic sensors 10 installed at the front side of the vehicle will now be described.

In describing the ultrasonic sensor 10 of the present disclosure described below, a position of a specific sensor (for example, a central sensor) is primarily described. However, the present disclosure is not limited thereto, and it is apparent to those skilled in the art that other sensors can be selectively used (for example, left and right sensors) according to a layout of the ultrasonic sensors installed in the vehicle or a shape of a vehicle bumper.

As illustrated, the ultrasonic sensors 10 (a left sensor, a left central sensor, a right central sensor, and a right sensor in order) that are disposed in parallel at a predetermined interval are configured to sense the wind by analyzing a waveform of an ultrasonic wave received through transmission and reception of the ultrasonic signal.

In an exemplary embodiment of the present disclosure, the controller 20 controls the left central sensor and the right central sensor to transmit the ultrasonic signal among the ultrasonic sensors 10 in order to sense the wind.

First, the controller 20 controls the left central sensor to transmit the ultrasonic signal (S001). The ultrasonic signal transmitted from the left central sensor is reflected to be received by the left sensor, the left central sensor, and the right central sensor (a primary indirect signal) when a strong wind is not blown (or in a stop state). The controller 20 then analyzes the waveform of the ultrasonic signal received by the left sensor, the left central sensor, and the right central sensor (S002).

Thereafter, the controller 20 controls the right central sensor to transmit the ultrasonic signal (S003). The ultrasonic signal transmitted from the right central sensor is reflected to be received by the left sensor, the left central sensor, and the right central sensor (a secondary indirect signal) when the strong wind is not blown (or in the stop state), and the controller 20 analyzes the waveform of the ultrasonic signal received by the left sensor, the left central sensor, and the right central sensor (S004).

The controller 20 recognizes the waveform of the ultrasonic signal when the strong wind is not blown (or the stop state). The steps are repeated even when the vehicle is driven, and a changed magnitude of the ultrasonic signal waveform (the primary indirect signal and the secondary indirect signal) at each receiving sensor is analyzed to determine the intensity of the wind. It is verified that from which sensor the signal is transmitted by position information of the ultrasonic signal waveform introduced into each ultrasonic sensor 10, and a direction of the signal may be determined through the magnitude of the signal changed.

Hereinafter, a method for sensing a wind and controlling a vehicle, which is achieved according to the steps described above, will be described for each condition in which a strong wind is generated.

Figure 5:
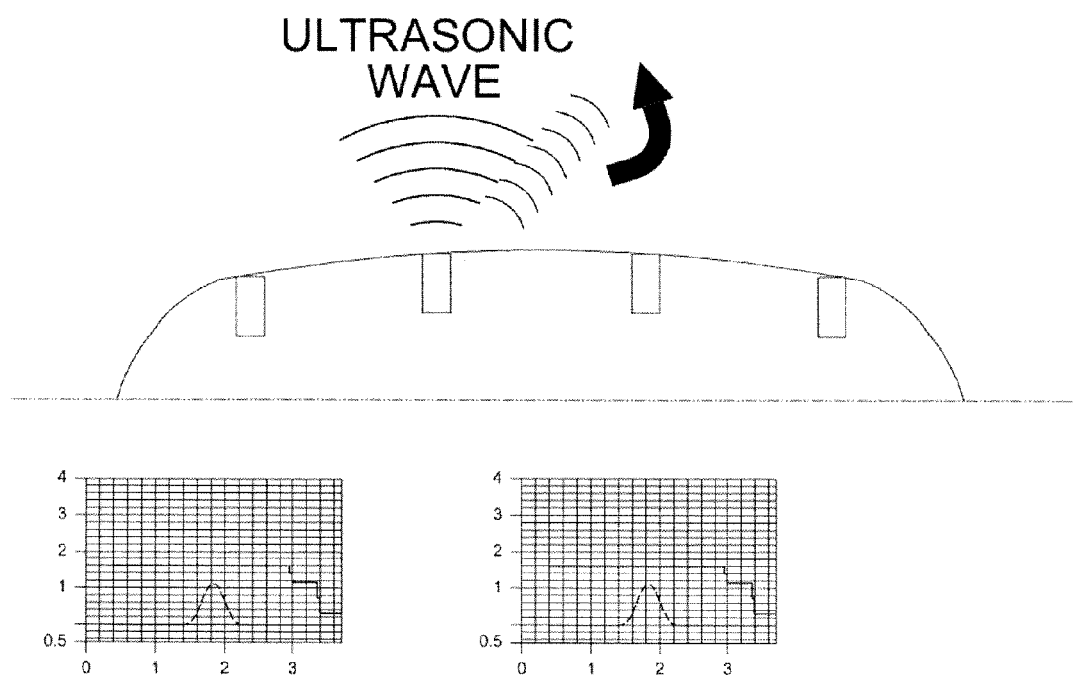
FIG. 5 illustrates a method for sensing a wind and controlling a vehicle using a parking assist system (PAS) according to an exemplary embodiment of the present disclosure under a condition without a strong wind.

FIG. 5 illustrates a method for sensing a wind and controlling a vehicle using a parking assist system (PAS) according to an exemplary embodiment of the present disclosure under a condition without the wind.

As illustrated, when there is no strong wind blowing while driving, the ultrasonic signal emitted from the left central sensor (alternatively, the right central sensor) is not refracted. As a result, the ultrasonic signals are not received by the ultrasonic sensors 10 (the left sensor, the left central sensor, and the right central sensor). In this case, an ultrasonic signal may be indirectly received through a vehicle bumper, but the received ultrasonic signal may be disregarded.

When an obstacle exists in front of and at back of the vehicle without the strong wind, the ultrasonic signal may be refracted and received by the ultrasonic sensor. However, when the PAS senses the obstacle, it is irrespective of strong wind control. Accordingly, the controller 20 performs the first control step, that is, the control OFF step, when the strong wind does not exist in front of the vehicle.

Figure 6:
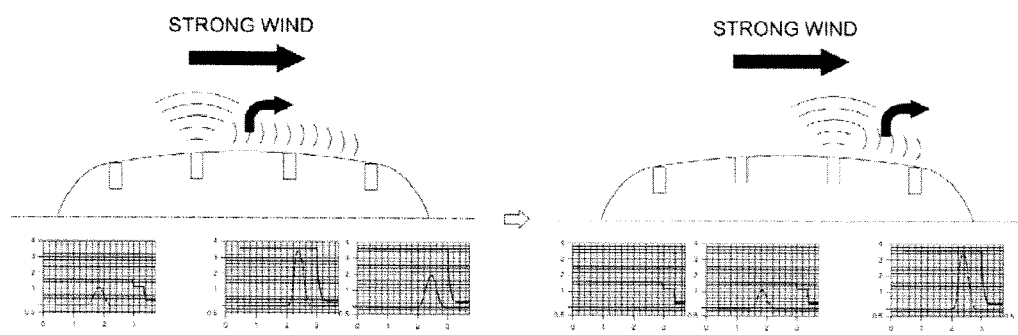
FIG. 6 illustrates a method for sensing a wind and controlling a vehicle using a parking assist system (PAS) according to an exemplary embodiment of the present disclosure under a condition in which a strong wind present in front of the vehicle blows in a right direction.

FIG. 6 illustrates a method for sensing a wind and controlling a vehicle using a parking assist system (PAS) according to an exemplary embodiment of the present disclosure under a condition in which a strong wind exists in front of the vehicle and blows in a right direction.

As illustrated, when the strong wind exists while driving a vehicle, and the wind is blown to a right side, an ultrasonic signal transmitted from a left central sensor is refracted to a right side of the vehicle by the strong wind under control of the controller 20. The refracted ultrasonic signal is received by the right central sensor and/or the right sensor positioned at a right side of the left central sensor that emits the ultrasonic signal. The controller 20 receives the ultrasonic signals indirectly received by the ultrasonic sensors 10 and analyzes waveforms of the ultrasonic signals.

Thereafter, the ultrasonic signal emitted from the right central sensor is also refracted to the right side by the strong wind under control of the controller 20. Accordingly, the refracted ultrasonic signal is received by the right sensor positioned at a right side of the right central sensor that emits the ultrasonic signal. The controller 20 receives the ultrasonic signals indirectly received by the ultrasonic sensors 10 and analyzes the waveforms of the ultrasonic signals.

The controller 20 compares the waveforms of the ultrasonic signal analyzed in each step with the waveform analyzed in the previous step to detect the intensity of the wind. In other words, when the waveform of the ultrasonic signal analyzed in each step is larger than the waveform analyzed in the previous step, it may be determined that the intensity of the wind is larger (S005). On the contrary, when the waveform of the ultrasonic signal analyzed in each step is smaller than the waveform analyzed in the previous step, it may be determined that the intensity of the wind is smaller (S006).

The controller 20 may sense the direction of the wind through relative positions of the ultrasonic sensor 10 that emits an initial ultrasonic signal and the ultrasonic sensor 10 that receives the refracted ultrasonic signal. In other words, the controller 20 compares the position of the ultrasonic sensor 10 that transmits the ultrasonic signal in each step and the position of the ultrasonic sensor 10 that receives the indirectly received ultrasonic signal to determine that the strong wind blows toward the position of the ultrasonic sensor 10 that receives the indirectly received ultrasonic signal.

In more detail, during the process, the controller 20 may verify that the strong wind moves from the left side to the right side when the waveform of the indirectly received signal of the right central sensor is larger than the waveform of the received ultrasonic signal of the left central sensor (S007).

Therefore, the controller 20 performs the second control step to output the warning message or the third step control step to perform an active steering control step according to the intensity of the wind which is set in advance based on the direction and the intensity of the wind.

Figure 7:
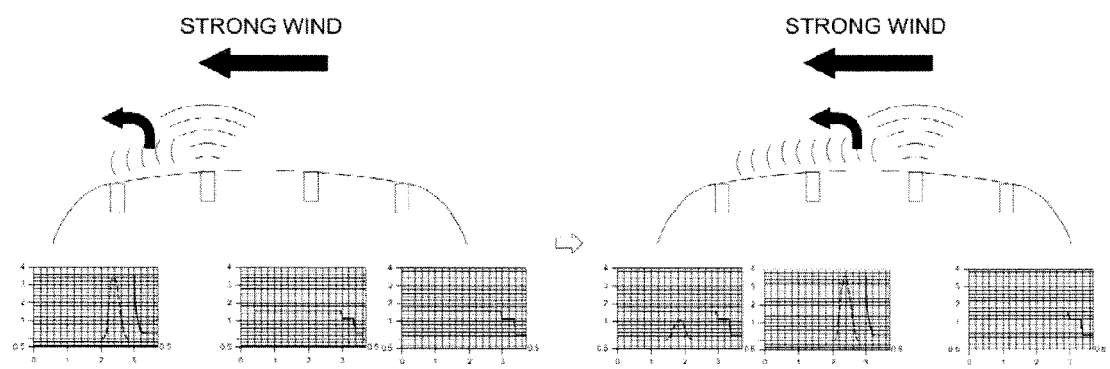
FIG. 7 illustrates a method for sensing a wind and controlling a vehicle using a parking assist system (PAS) according to an exemplary embodiment of the present disclosure under a condition in which a strong wind present in front of the vehicle blows in a left direction.

FIG. 7 illustrates a method for sensing a wind and controlling a vehicle using a parking assist system (PAS) according to an exemplary embodiment of the present disclosure under a condition in which a strong wind exists in front of the vehicle and is blown in a left direction.

As illustrated, when the strong wind exists while driving the vehicle, and the strong wind blows to the left side, the ultrasonic signal transmitted from the left central sensor is refracted to the left side by the strong wind under control of the controller 20. Accordingly, the refracted ultrasonic signal is received by the left sensor disposed at the left side of the left central sensor that emits the ultrasonic signal. The controller 20 receives the ultrasonic signals indirectly received by the ultrasonic sensors 10 and analyzes the waveforms of the ultrasonic signals.

Thereafter, the ultrasonic signal emitted from the right central sensor is also refracted to the left side by the strong wind under control of the controller 20. Accordingly, the refracted ultrasonic signal is received by the left central sensor and/or the left sensor positioned at the left side of the right central sensor that emits the ultrasonic signal. The controller 20 receives the ultrasonic signals indirectly received by the ultrasonic sensors 10 and analyzes the waveforms of the ultrasonic signals.

The controller 20 compares the waveforms of the ultrasonic signal analyzed in each step with the waveform analyzed in the previous step to detect the intensity of the wind. In other words, when the waveform of the ultrasonic signal analyzed in each step is larger than the waveform analyzed in the previous step, it may be determined that the intensity of the wind is larger (S005). On the contrary, when the waveform of the ultrasonic signal analyzed in each step is smaller than the waveform analyzed in the previous step, it may be determined that the intensity of the wind is smaller (S006).

The controller 20 may sense the direction of the wind through relative positions of the ultrasonic sensor 10 that emits an initial ultrasonic signal and the ultrasonic sensor 10 that receives the refracted ultrasonic signal. In other words, the controller 20 compares the position of the ultrasonic sensor 10 that transmits the ultrasonic signal in each step and the position of the ultrasonic sensor 10 that receives the indirectly received ultrasonic signal to determine that strong wind blows toward the position of the ultrasonic sensor 10 that receives the indirectly received ultrasonic signal.

In more detail, during the process, the controller 20 may verify that the strong wind progresses from the right side to the left side when the waveform of the indirectly received signal of the left central sensor is larger than the waveform of the received ultrasonic signal of the right central sensor (S007).

Therefore, the controller 20 performs the second control step that outputs the warning message or the third step control step that performs an active steering control step according to the intensity of the wind which is set in advance based on the sensed direction and intensity of the wind.

According to an exemplary embodiment of the present disclosure, a configuration in which the ultrasonic sensors 10 provided at the front side of the vehicle is used to sense the strong wind. However, in another exemplary embodiment of the present disclosure, strong winds, which blow at the front side and the rear side of the vehicle, are sensed by all of the ultrasonic sensors 10 provided at the front and rear sides of the vehicle to determine the direction and the intensity of the wind more clearly. In this case, the controller 20 receives the ultrasonic signals received from the respective ultrasonic signals received by the respective ultrasonic sensors 10 provided at the front side and at the rear side of the vehicle.

Although the method, according to an exemplary embodiment of the present disclosure, for sensing a wind and controlling a vehicle using a parking assist system (PAS) has been described as above, it is presented as a specific example in order to help understanding the present disclosure and does not intend to limit the scope of the present disclosure. It is apparent to those skilled in the art by those skilled in the art that other modified examples can be implemented based on the spirit of the present disclosure, except for the exemplary embodiments disclosed herein.

What is claimed is:

1. A method for sensing a wind and controlling a vehicle using a parking assist system (PAS) including a plurality of ultrasonic sensors and output devices, comprising:
   controlling, by a controller, a first ultrasonic sensor disposed at a front side of the vehicle to transmit an ultrasonic signal;
   receiving, by the controller, respective primary indirect signals received from the ultrasonic sensors at the front side other than the first ultrasonic sensor;
   controlling, by the controller, a second ultrasonic sensor adjacent to the first ultrasonic sensor to transmit the ultrasonic signal;
   receiving, by the controller, respective primary indirect signals received from the ultrasonic sensors at the front side other than the second ultrasonic sensor; and
   sensing, by the controller, the direction of the wind through a comparison of relative sizes of waveforms of each primary indirect signal and each secondary indirect signal.

2. The method of claim 1, further comprising:
   sensing, by the controller, that a strong wind moves toward the second ultrasonic sensor from the first ultrasonic sensor when the waveform of each primary indirect signal is larger than the waveform of each secondary indirect signal; and sensing, by the controller, that the strong wind moves toward the first ultrasonic sensor from the second ultrasonic sensor when the waveform of each primary indirect signal is smaller than the waveform of each secondary indirect signal.

3. The method of claim 1, further comprising:
comparing, by the controller, a waveform of each primary indirect signal or a secondary interference signal newly received with the waveform of each primary indirect signal or each secondary indirect signal.

4. The method of claim 3, further comprising:
transmitting, by the controller, a warning message to an output when the sensed intensity of the wind is a first intensity.

5. The method of claim 3, further comprising:
providing, by the controller, steering assistance force from a steering controller when the sensed intensity of the wind is a second intensity and the steering assistance force to correspond to the sensed direction of the wind.

6. The method of claim 3, further comprising:
comparing, by the controller, a waveform of a primary indirect signal or a secondary indirect signal newly received with the waveform of each primary indirect signal or each secondary indirect signal; and changing the intensity of the wind in proportion to the waveform of the primary indirect signal or the secondary indirect signal newly received with the waveform of each primary indirect signal or each secondary indirect signal.

7. The method of claim 1, further comprising:
controlling, by the controller, a third ultrasonic sensor disposed at a rear side of the vehicle to transmit the ultrasonic signal;

receiving, by the controller, respective primary indirect signals received from rear ultrasonic sensors other than the third ultrasonic sensor;

controlling, by the controller, a fourth ultrasonic sensor adjacent to the third ultrasonic sensor to transmit the ultrasonic signal; and further receiving, by the controller, respective secondary indirect signals received from the rear ultrasonic sensors other than the fourth ultrasonic sensor.

* * * * *